Figure 1:
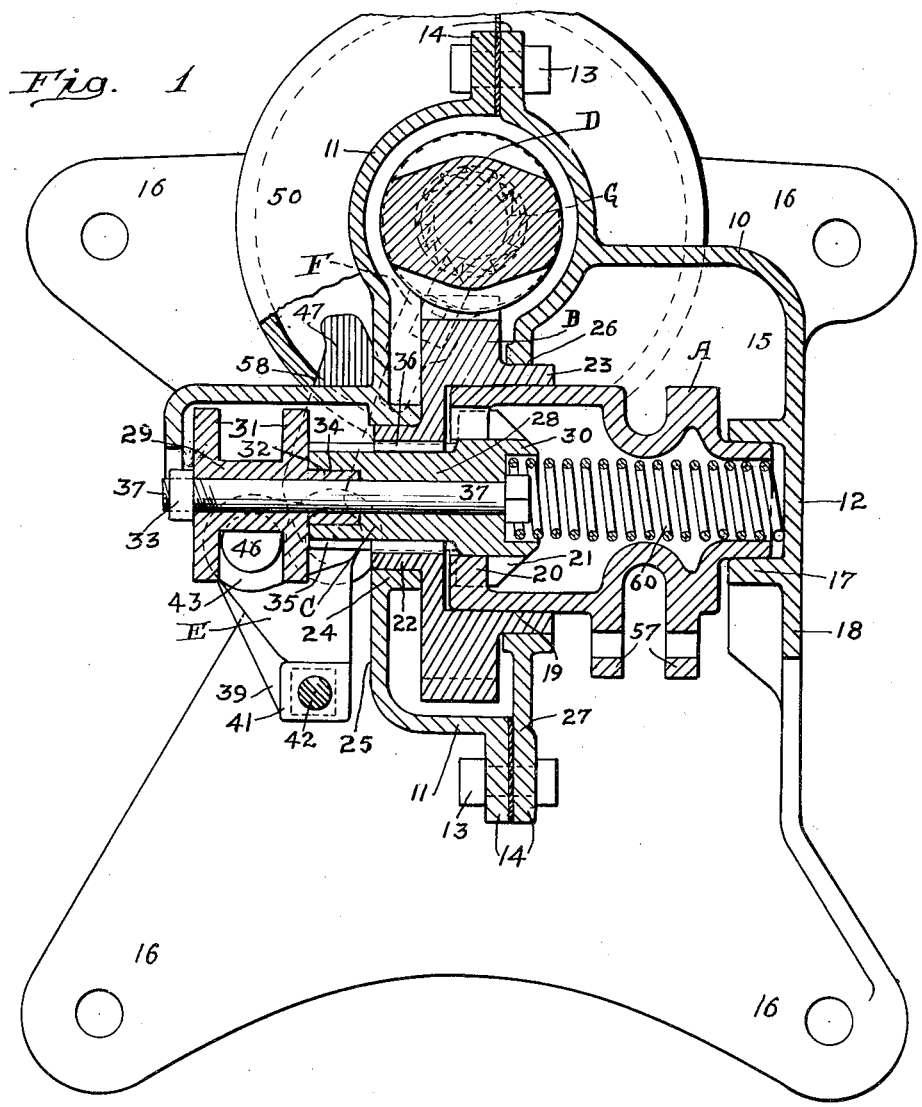

Nov. 7, 1950     K. WILLIAMS     2,529,064
HAND BRAKE

Filed Sept. 6, 1946     3 Sheets-Sheet 1

Inventor:
Keith Williams.
By George I. Haight
Atty.

Nov. 7, 1950     K. WILLIAMS     2,529,064
HAND BRAKE
Filed Sept. 6, 1946     3 Sheets-Sheet 2
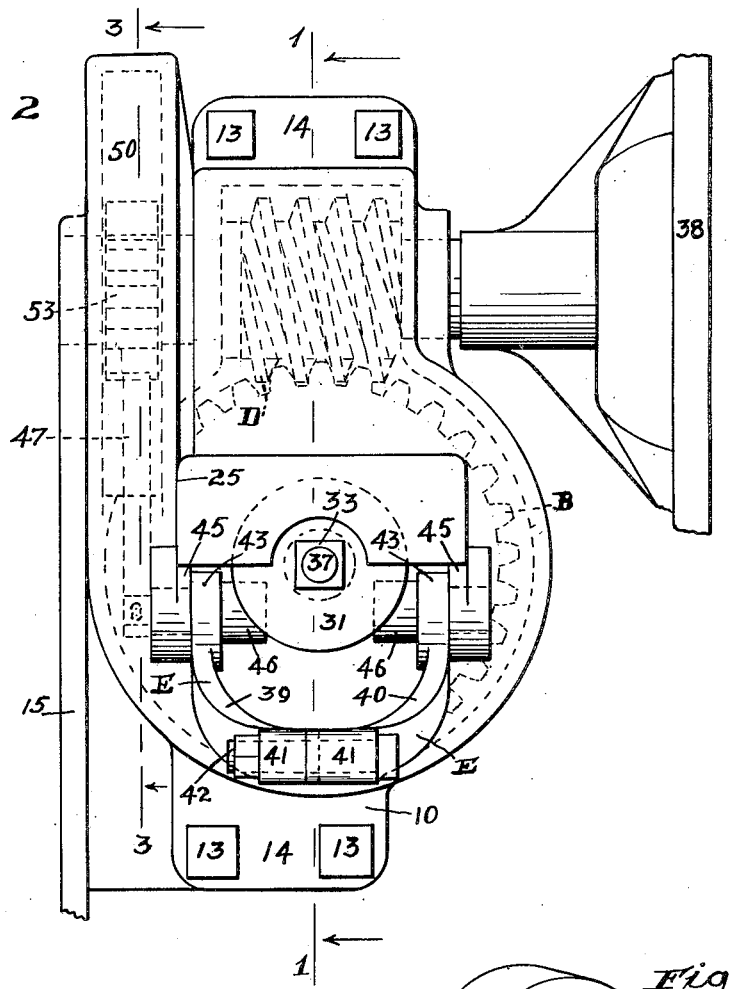
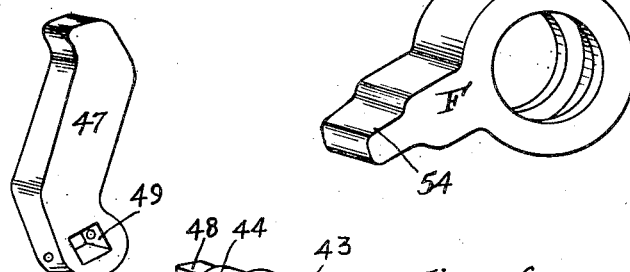
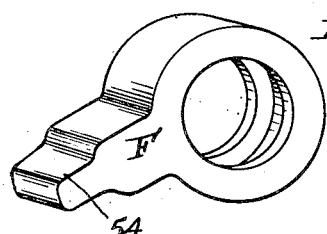
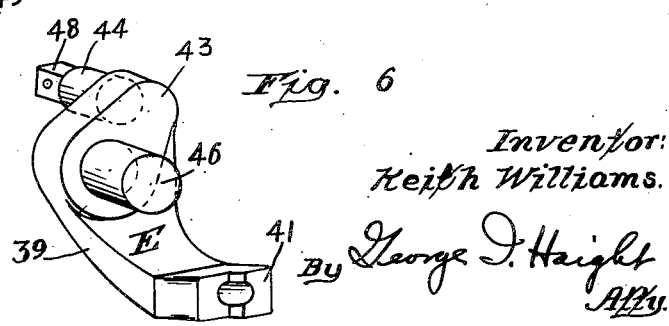
Inventor:
Keith Williams.
By George I. Haight
Atty.

Nov. 7, 1950     K. WILLIAMS     2,529,064
HAND BRAKE
Filed Sept. 6, 1946     3 Sheets-Sheet 3
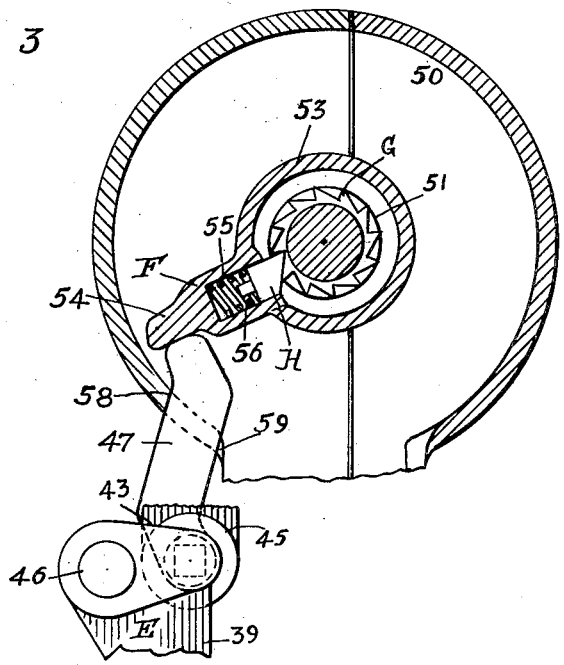
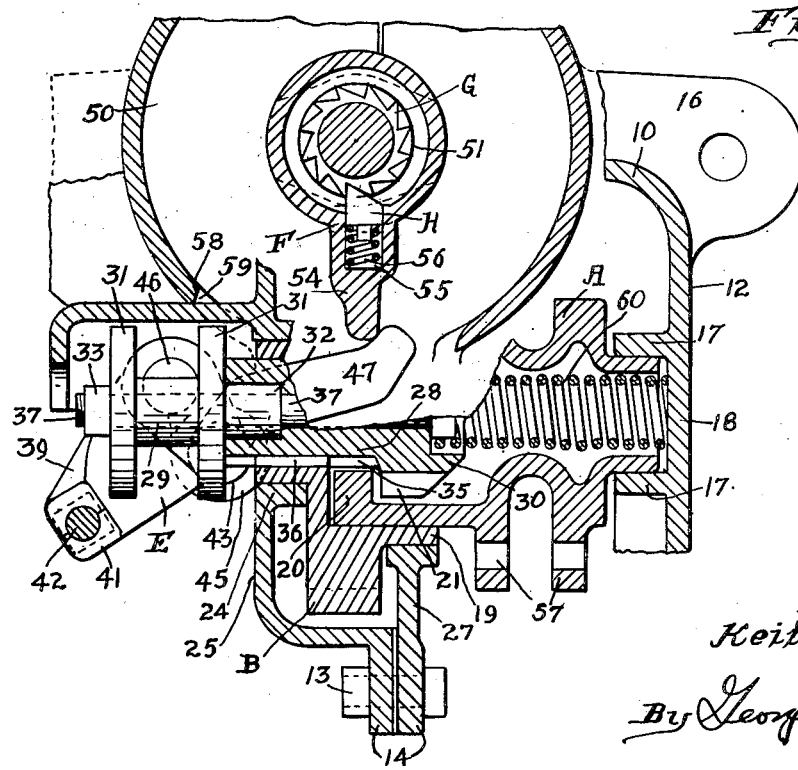
Inventor:
Keith Williams.
By George I. Haight
Atty.

Patented Nov. 7, 1950

2,529,064

UNITED STATES PATENT OFFICE 2,529,064

HAND BRAKE

Keith Williams, Buffalo, N. Y.

Application September 6, 1946, Serial No. 695,078

18 Claims. (Cl. 74—505)

This invention relates to improvements in Hand Brakes.

One object of the invention is to provide a hand brake mechanism for railway cars, comprising a chain-winding drum and manually-actuated rotary means for actuating the drum and a clutch operatively connecting the drum to the rotary means to actuate the latter and provide for quick release of the brakes by free rotation of the drum through disengagement of the clutch, wherein disengagement of the latter is automatically effected through rotation of the manually-actuated means in chain-unwinding direction.

A more specific object of the invention is to provide a brake mechanism, as set forth in the preceding paragraph, wherein automatic disengagement of the clutch is effected by clutch-shifting lever means actuated by a rotary trip member connected to the manually-actuated rotary means by pawl and ratchet mechanism adapted to lock the trip element to the manually-actuated rotary means for rotation therewith to actuate the clutch-shifting lever means to release the clutch upon rotation of the manually-actuated means in chain-unwinding direction.

Other objects of the invention will more clearly appear from the description and claims hereinafter following.

In the accompanying drawings, forming a part of this specification, Figure 1 is a transverse, vertical, sectional view, partly in elevation, of my improved hand brake mechanism, the mechanism being shown in the position it occupies when applied to a car, said view corresponding substantially to the line 1—1 of Figure 2. Figure 2 is a side elevational view of the improved hand brake mechanism, looking from left to right in Figure 1. Figure 3 is a vertical, sectional view, corresponding substantially to the line 3—3 of Figure 2, partly broken away, with the spool of the clutch element omitted, showing the clutch-shifting lever in elevation and illustrating the parts in the position assumed at the beginning of the clutch-shifting operation. Figure 4 is a transverse, vertical, sectional view of my improved hand brake mechanism, taken in generally the same plane as Figure 3, showing the chain-winding drum and clutch element in the plane of Figure 1, and illustrating the parts in the position assumed when the clutch is disengaged. Figure 5 is a detail perspective view of the lever arm of the clutch-shifting lever means. Figure 6 is a detail perspective view of one of the members of the clutch yoke of the clutch-shifting lever means. Figure 7 is a detail perspective view of the rotary trip member which actuates the clutch-shifting lever means.

My improved hand brake mechanism, as shown in the drawings, comprises broadly a chain-winding drum A, a worm wheel B, a sliding clutch element C operatively connecting the drum to the worm wheel, a worm D meshing with the worm wheel and actuated by the usual hand wheel of the brakes, a clutch-shifting yoke E, a rotary trip member F, a ratchet wheel G rotatable with the worm D, and a spring-pressed pawl or dog H operatively connecting the ratchet wheel and trip member F.

As shown in the drawings, my improved hand brake mechanism is preferably enclosed in a two-part, vertically divided housing 10 comprising sections 11 and 12. Each section of the housing is in the form of a chamber. The sections 11 and 12 are secured to each other by bolts 13 extending through suitable flanges 14 on said sections. The back wall of the housing 10, which wall is indicated by 15, is extended laterally outwardly of the housing proper to provide securing flanges or lugs 16 for mounting the mechanism on the end wall of a car.

The chain-winding drum A is rotatably mounted within the housing section 12 having the right-hand end thereof, as seen in Figure 1, journaled in a bearing member 17 projecting from the inner side of the right-hand side wall 18 of the housing. The opposite end of the drum is supported by the worm wheel B, the latter being provided with a cylindrical bearing opening or seat 19 within which said end of the drum is journaled. As shown, the drum A is hollow and open at its left-hand end and has internal clutch teeth 20 spaced inwardly from said open end, which clutch teeth cooperate with clutch teeth 21 on the clutch element C.

The worm wheel B has hollow hub members 22 and 23 at opposite ends thereof, by which it is supported, the hub member 22 being journaled in a bearing opening 24 provided in the left-hand side wall 25 of the housing 10, and the hub member 23 being journaled in a bearing opening 26 provided in a vertical partition wall 27 formed on the section 12 of the housing and separating the chambers provided by the sections 11 and 12.

The clutch element C is slidingly supported by the worm wheel B and has rotation therewith. The element C is preferably made of two parts 28 and 29 to facilitate assembly with the other parts of the mechanism. The part 28 is in the form of a cylindrical member having a clutch head 30 at its inner or right-hand end, as seen in Figure 1. The clutch head 30 carries the teeth 21, hereinbefore referred to, which teeth cooperate with the teeth 20 of the drum A. The part 29 of the clutch element C is in the form of a spool having spaced annular flanges 31—31 and hub member 32 at the inner end thereof. The flanges 31—31 form a guideway therebetween. The hub member 32 is seated in an axial opening or socket 34 in the adjacent end of the part 28. The clutch element C is rotatable with the worm wheel B and is supported for axial sliding movement with respect to the same and the chain-winding drum A, having the part 28 thereof supported in the hollow hub member 22 of the worm wheel, the part 28 being provided with key-ways or slots 35 engaged by integral key members 36 on the worm wheel B. The part 28 of the clutch element C extends into the hollow portion of the drum A with the clutch teeth 21 thereof normally engaged with the teeth 20 of the drum. The two parts of the clutch element are held together by a clamping bolt 37 extending therethrough and having the headed end thereof seated in a socket at the inner end of the part 28 and the nut 33 thereof seated against the outer end of the spool 29.

The worm D, which meshes with the worm wheel B, is arranged above the latter, being rotatably supported in suitable bearings provided in the housing 10. The worm is rotated by the usual hand wheel 38.

The clutch-shifting yoke E comprises a fork member composed of two parts 39 and 40 having complementary, overlapping, interengaging portions which lock the parts together against relative rotation, the part 39 being provided with a projection 41, as shown most clearly in Figure 6, and the part 40 having a similar projection. The parts 39 and 40 are clamped together by a bolt 42 extending through the same. The parts 39 and 40 terminate in upstanding, laterally spaced arms 43—43 having laterally outwardly extending, axially aligned pivots 44—44 at their upper ends rotatably journaled in spaced, projecting bearing arms 45—45 on the side wall 25 of the housing. On the inner sides, the arms 43—43 are provided with aligned trunnions 46—46 which are eccentric to the pivots 44—44 and engage between the flanges 31—31 of the spool portion 29 of the clutch element C. The part 39 of the yoke member E carries an upstanding lever arm 47 of the general shape shown in Figure 5, this arm being secured to a square extension 48 of the pivot 44 of the part 39. As shown, the inner or lower end of the arm 47 is provided with a square socket 49, which receives the extension 48, and the parts are pinned together by any suitable securing element.

The rotary trip member F is mounted in a drumlike chamber 50 at the lefthand side of the housing 10, as seen in Figure 1, said chamber being formed partly on each section 11 and 12 of the housing. The worm D has an extended shaft portion 51 which projects into the chamber 50 and has an annular set of ratchet teeth thereon, thereby providing the integral ratchet wheel G. The trip member F is rotatably journaled on the ratchet wheel portion of the shaft 51, being provided with a hollow, cylindrical, sleevelike bearing portion 53 rotatable on the shaft and having a radially projecting arm or finger 54. The bearing sleeve 53 of the member F has an interior, annular channel registering with the toothed portion of the ratchet wheel G, and the arm 54 of the trip member is provided with a socket 55 opening into said channel. The socket 55 is of square cross section, and the locking dog H, which is also of square cross section, has a sliding fit within the socket. A coil spring 56, disposed within the socket 55, yieldingly holds the pawl or dog H projected to cooperate with the teeth of the ratchet wheel G. The arrangement of the ratchet teeth is such that the pawl or dog H will ratchet over the same when the wheel is rotated in clockwise direction, as viewed in Figure 1, and will interlock with the teeth when the ratchet wheel is rotated in contraclockwise direction to effect rotation of the trip member F in unison with the worm. The arm 47 of the yoke E extends into the path of movement of the finger 54 of the rotary trip member and is actuated thereby to shift the clutch to disengaged position upon rotation of the trip member in contraclockwise direction.

The operation of my improved hand brake mechanism is as follows: To apply the brakes, the worm D is rotated in clockwise direction, as viewed in Figure 1, thereby rotating the worm wheel in clockwise direction also. The clutch element C being rotatable in unison with the worm wheel effects rotation of the drum A through clutching engagement therewith to wind the brake chain thereon. As is well known to those skilled in this art, the brake chain, which is not shown in the drawings, has one end connected to chain-anchoring lugs 57—57 on the drum and leads to the brake mechanism proper of the car. During the chain-winding operation, the spring-pressed pawl or dog H ratchets over the teeth of the ratchet wheel G, the trip member being held against rotation by engagement with the arm 47 of the yoke, which in turn is held against upward swinging movement by engagement with a stop shoulder 58 provided by the end wall of an opening 59 in the outer wall of the chamber 50, which opening accommodates the arm 47 for swinging movement.

In effecting release of the brakes, the worm D is rotated in a direction reverse to the rotation thereof in winding the chain on the drum, that is, in contraclockwise direction, thereby effecting rotation of the worm wheel B, clutch element C, and the drum A in countraclockwise direction also to unwind the chain from the drum. During this rotation of the parts in chain-unwinding direction, the rotary trip member F is locked to the ratchet wheel G by the dog or pawl H to rotate in unison with the worm D. During this rotation of the trip member, the finger 54 swings from the position shown in Figure 1 through the position shown in Figure 3 toward the position shown in Figure 4. As the finger 54 swings from the position shown in Figure 1 to that shown in Figure 3, it is brought into contact with the arm 47 and, as it moves from the position in Figure 3 to that in Figure 4, it cams the arm 47 to the right, swinging the yoke E to the position shown in Figure 4, thereby shifting the clutch element C to the right and disengaging the same from the drum A, thus freeing the latter for rotation with respect to the other parts of the mechanism and allowing the chain to unwind without rotation of the hand wheel and other parts of the driving means. As will be evident, the extent to which the brakes may be backed off or released by rotation of the hand wheel before complete quick release is obtained by free rotation of the drum is dependent upon the length of the arc of swinging movement of the finger of the trip member F in being rotated from the position shown in Figure 1 to the final position thereof shown in Figure 4. The parts are preferably proportioned and designed so that the amount of backward rotation permitted before quick release of the brakes is obtained is sufficient to provide for the required backing-off of the brakes to take care of the usual switching operations.

Restoration of the clutch element C to the normal position shown in Figure 1 is effected by the expansive action of the clutch spring 60, which normally holds the clutch in engaged position. Movement of the clutch from the position shown in Figure 4 to the position shown in Figure 1 swings the yoke E and its lever arm 47 back to the normal position, thereby, through camming engagement of the arm 47 with the finger 54, turning the trip member F back to the position shown in Figure 3. Upon again applying the brakes, the rotary trip member F is rotated in clockwise direction with the worm D until arrested by engagement of the finger 54 with the underneath side of the arm 47, as shown in Figure 1. While held in this position, the trip element ratchets freely over the ratchet wheel G during the remainder of the brake-tightening operation.

I claim:

1. In a hand brake mechanism, the combination with a rotary chain-winding drum; of manually-actuated means rotatable in reverse directions; a shiftable clutch operatively connecting the drum to the manually-actuated means; rotary means for rotating the manually actuated means in chain-winding and unwinding directions; and means for shifting the clutch to break the connection between the winding drum and manually-actuated means comprising a movable member connected to the clutch, a rotary member having shouldered engagement with the movable member to actuate the latter, and ratchet means operatively connecting said rotary member to the manually-actuated means for rotation therewith in chain-unwinding direction said ratchet means comprising a ratchet element on said rotary member and a corresponding ratchet element rotatable with said rotary means on an axis co-axial with the axis of rotation of said rotary means.

2. In a hand brake mechanism, the combination with a rotary chain-winding member; of a rotary driving member; a sliding shiftable clutch element rotatable with said driving member and having clutching engagement with said chain-winding member; a rotary element for rotating said driving member; lever means for actuating said clutch element to disengage the same; a trip element rotatable about the axis of said rotary element, said trip element being engageable with said lever means to actuate the latter; and means having clutching engagement with said rotary element upon rotation of the latter in chain-unwinding direction to rotate said trip element to actuate said lever means and shift the clutch element to disengaged position.

3. In a hand brake mechanism, the combination with a rotary chain-winding member; of a sliding shiftable clutch element engaged with said winding member to actuate the same; rotary means operatively connected to said clutch element for rotating the same and the chain-winding member; a rotary trip element; a clutch-shifting lever in the path of rotary movement of said trip element and engaged and actuated thereby to shift the clutch element; a ratchet wheel rotatable in unison with said rotary means; and a locking dog carried by said trip element having locking engagement with said ratchet wheel to rotate said trip element in unison with said rotary means when the latter is rotated in chain-unwinding direction and actuate said clutch-shifting lever to disengage the clutch element.

4. In a hand brake mechanism, the combination with a rotary chain-winding member; of a rotary driving member; a clutch operatively connecting said winding member and driving member; manually-actuated rotary means operatively connected to said driving member for rotating the same in reverse directions; clutch-shifting means; and means for actuating said clutch-shifting means comprising a rotary trip member engageable with said clutch-shifting means to actuate the same, a ratchet wheel rotatable with said manually-actuated means, and a dog carried by said rotary trip member and having ratcheting engagement with said ratchet wheel when rotated in one direction and locking engagement therewith when rotated in a reverse direction to operatively connect the trip member to said manually-actuated rotary means for rotation in unison therewith to engage the trip member with and actuate said clutch-shifting means to disengage the clutch.

5. In a hand brake mechanism, the combination with a rotary chain-winding member; of a rotary driving member; a reciprocating clutch operatively connecting said winding member and driving member; a rotary element operatively connected to said driving member for rotating the same in reverse directions; a trip member rotatable about the axis of said rotary element and having an arm; a lever for actuating said clutch, said lever being in the path of movement of said arm to be actuated by rotation of said trip member; and ratchet means for locking the trip member to said rotary element for rotation in unison therewith when the latter is rotated in one direction to actuate said lever and shift the clutch to disengaged position, said ratchet means having ratcheting action during rotation of said rotary element in reverse direction, thereby permitting rotation of the manually-actuated means with respect to said trip member.

6. In a hand brake mechanism, the combination with a rotary chain-winding member; of a rotary driving member; a manually-actuated rotary element for rotating said driving member; a sliding shiftable clutch element rotatable with said driving member and having clutching engagement with said chain-winding member; a ratchet element fixed to said rotary element for rotation in unison therewith; a rotary member having a projecting arm, said rotary member having ratcheting engagement with said ratchet element to idle over the same when said ratchet element and rotary element are rotated in chain-winding direction, and having locking engagement with said ratchet element to rotate in unison therewith when said ratchet element and rotary element are rotated in chain-unwinding direction; and a clutch-shifting lever in the path of rotary movement of said arm and actuated by movement of the latter to shift the clutch element to disengaged position.

7. In a hand brake mechanism, the combination with a rotary chain-winding member; of a rotary driving member; a manually-actuated rotary element for rotating said driving member;

a ratchet wheel fixed to said rotary element for rotation in unison therewith; a rotary trip element; a pawl on said trip element engaging said ratchet wheel, said pawl idling over said ratchet wheel when the latter and the rotary element are rotated in chain-winding direction, said pawl having locking engagement with said ratchet wheel when the latter and the rotary element are rotated in chain-unwinding direction to rotate said trip element; a sliding shiftable clutch member rotatable with said driving member and having clutching engagement with said winding member; and a lever for shifting said clutch member, said lever being in the path of rotary movement of said trip element and engaged and actuated thereby to shift the clutch member to disengaged position.

8. In a hand brake mechanism, the combination with a rotary chain-winding member; of a rotary driving member; a shiftable clutch element operatively connecting the driving member and winding member; a reversely rotatable member operatively connected to the driving member for rotating the same in chain-winding and unwinding directions; a ratchet wheel rotatable with said reversely rotatable member; a rotary trip element rotatable about said ratchet wheel; a sliding locking pawl carried by said trip element cooperating with said ratchet wheel, said pawl having locking engagement with the ratchet wheel when the latter is rotated in chain-unwinding direction to effect rotation of the trip element in unison with said ratchet wheel; and a lever for shifting said clutch element, said lever being in the path of movement of said trip element and actuated thereby to shift the clutch element to disengaged position.

9. In a hand brake mechanism, the combination with a rotary chain-winding drum; of a rotary worm wheel; a shiftable clutch element operatively connecting the worm wheel to the drum; a rotary worm element meshing with the worm wheel; a ratchet wheel fixed to said worm element for rotation therewith; a trip element rotatable about said ratchet wheel, said trip element having a projecting finger; a pawl on said trip element engaging said ratchet wheel to lock the trip element to the wheel when the latter is rotated in chain-unwinding direction; and a lever for shifting the clutch element, said lever extending into the path of rotary movement of said finger to be actuated by said trip element to disengage the clutch element from the drum.

10. In a hand brake mechanism having a rotary chain-winding drum, manually actuated means rotatable in reverse directions, a shiftable clutch operatively connecting the drum to the manually actuated means, a rotary element for rotating the manually actuated means in chain-winding and unwinding directions, and a movable member connected to the clutch for shifting the clutch to break the connection between the winding drum and the manually actuated means, the improvement which comprises a rotary member having shouldered engagement with the movable member to actuate the movable member, and ratchet means operatively connecting said rotary member to the manually actuated means for rotation therewith in chain-unwinding direction, said ratchet means comprising a ratchet element on said rotary member and a corresponding ratchet element rotatable with said rotary element on an axis co-axial with the axis of rotation of said rotary element.

11. In a hand brake mechanism having a rotary chain-winding member, a rotary driving member, a rotary element for rotating said driving member, a sliding shiftable clutch element rotatable with said driving member and having clutching engagement with said chain-winding member, and lever means for actuating said clutch element to disengage the same, the improvement which comprises a trip element rotatable about the axis of said rotary element and being engageable with said lever means to actuate the latter, and means having clutching engagement with the rotary element upon rotation of the latter in chain-unwinding direction to rotate said trip element to actuate said lever means and to shift the clutch element to disengaged position.

12. In a hand brake mechanism having a rotary chain-winding member, a sliding shiftable clutch element engaged with said winding member to actuate the same, rotary means operatively connected to said clutch element for rotating the same and the chain winding member, and a clutch shifting lever, the improvement which comprises a rotary trip element, said clutch shifting lever being in the path of rotary movement of said trip element and being engaged and actuated thereby to shift the clutch element, a ratchet wheel rotatable in unison with said rotary means, and a locking dog carried by said trip element having locking engagement with said ratchet wheel to rotate said trip element in unison with said rotary means when the latter is rotated in chain-unwinding direction and to actuate said clutch shifting lever to disengage the clutch element.

13. In a hand brake mechanism having a rotary chain-winding member, a rotary driving member, a clutch operatively connecting said winding member and said driving member, manually actuated rotary means operatively connected to said driving member for rotating the same in reverse directions, and clutch shifting means, the improvement which comprises means for actuating said clutch shifting means comprising a rotary trip member engageable with said clutch shifting means to actuate the same, a ratchet wheel rotatable with said actuated means, and a dog carried by said rotary trip member and having ratcheting engagement with said ratchet wheel when rotated in one direction and locking engagement therewith when rotated in a reverse direction to connect the trip member operatively to said manually actuated rotary means for rotation in unison therewith to engage the trip member with and actuate said clutch shifting means to disengage the clutch.

14. In a hand brake mechanism having a rotary chain-winding member, a rotary driving member, a reciprocating clutch operatively connecting said winding member and driving member, a rotary element operatively connected to said driving member for rotating the same in reverse directions and a lever for actuating said clutch, the improvement which comprises a trip member rotatable about the axis of said rotary element and having an arm, said lever for actuating said clutch being in the path of movement of said arm to be actuated by rotation of said trip member, and ratchet means for locking the trip member to the manually actuated means for rotation in unison therewith when the latter is rotated in one direction to actuate said lever and shift the clutch to disengaged position, said ratchet means having ratcheting action during rotation of said rotary element in reverse direction, thereby permitting rotation of the manually actuated means with respect to said trip element.

15. In a hand brake mechanism having a rotary chain-winding member, a rotary driving member, a manually actuated rotary element for rotating said driving member, a sliding shiftable clutch element rotatable with said driving member and having clutching engagement with said chain-winding member, and a clutch shifting lever, the improvement which comprises a ratchet element fixed to said rotary element for rotation in unison therewith and a rotary member, the rotary member having a projecting arm, said rotary member having ratcheting engagement with said ratchet element to idle over the same when said ratchet element and rotary element are rotated in chain-winding direction and having locking engagement with said ratchet element to rotate in unison therewith when said ratchet element and rotary element are rotated in chain-unwinding direction, said clutch shifting lever being in the path of rotary movement of said arm and actuated by movement of the latter to shift the clutch element to disengaged position.

16. In a hand brake mechanism having a rotary chain-winding member, a rotary driving member, a manually actuated rotary element for rotating said driving member, a sliding shiftable clutch member rotatable with said driving member and having clutching engagement with said winding member, and a lever for shifting said clutch member, the improvement which comprises a ratchet wheel fixed to said rotary element for rotation in unison therewith, a rotary trip element, and a pawl on said trip element engaging said ratchet wheel, said pawl idling over said ratchet wheel when the latter and the rotary element are rotated in chain-winding direction, said pawl having locking engagement with said ratchet wheel when the latter and the rotary element are rotated in chain-unwinding direction to rotate said trip element, said lever for shifting said clutch member being in the path of rotary movement of said trip element and engaged and actuated thereby to shift the clutch member to disengaged position.

17. In a hand brake mechanism having a rotary chain-winding member, a rotary driving member, a slidable clutch element operatively connecting the driving member and the winding member, a reversely rotatable member operatively connected to the driving member for rotating the same in chain-winding and unwinding directions, and a lever for shifting said clutch element, the improvement which comprises a ratchet wheel rotatable with said reversely rotatable member, a rotary trip element rotatable about said ratchet wheel, and a sliding locking pawl carried by said trip element cooperating with said ratchet wheel, said pawl having locking engagement with the ratchet wheel when the latter is rotated in chain-unwinding direction to effect rotation of the trip element in unison with said ratchet wheel, said lever for shifting said clutch element being in the path of movement of the trip element and actuated thereby to shift the clutch element to disengaged position.

18. In a hand brake mechanism having a rotary chain-winding drum, a rotary worm wheel, a shiftable clutch element operatively connecting the worm wheel to the drum, a rotary worm element meshing with the worm wheel, and lever for shifting the clutch element, the improvement which comprises a ratchet wheel fixed to said worm element for rotation therewith, a trip element rotatable about said ratchet wheel, a projecting finger on said trip element, and a pawl on said trip element engaging said ratchet wheel to lock the trip element to the wheel when the latter is rotated in chain-unwinding direction, said lever for shifting the clutch element extending into the path of rotary movement of said finger to be actuated by said trip element to disengage the clutch element from the drum.

KEITH WILLIAMS.

REFERENCES CITED

The following references are of record in the file of this patent:

UNITED STATES PATENTS

| Number | Name | Date |
|---|---|---|
| 1,909,952 | Haseltine | May 23, 1933 |
| 1,928,027 | Olander | Sept. 26, 1933 |
| 2,049,715 | Olander | Aug. 4, 1936 |
| 2,090,757 | Heitner | Aug. 24, 1937 |